United States Patent
Singh Thind et al.

(10) Patent No.: US 11,645,056 B2
(45) Date of Patent: May 9, 2023

(54) CAPTURING VARIABLE DEPENDENCIES USING A VARIABLE AGNOSTIC OBJECT

(71) Applicant: Intuit Inc., Mountain View, CA (US)

(72) Inventors: Samarinder Singh Thind, Bangalore (IN); Rajat Khare, Bangalore (IN); Neelam Singh, Bangalore (IN); Suresh Krishna Devanathan, Bangalore (IN); Deepak Radhakrishna, Bangalore (IN)

(73) Assignee: Intuit Inc., Mountain View, CA (US)

( * ) Notice: Subject to any disclaimer, the term of this patent is extended or adjusted under 35 U.S.C. 154(b) by 14 days.

(21) Appl. No.: 17/376,526

(22) Filed: Jul. 15, 2021

(65) Prior Publication Data
US 2023/0014994 A1    Jan. 19, 2023

(51) Int. Cl.
G06F 8/41    (2018.01)
H04L 67/00   (2022.01)
G06F 8/20    (2018.01)

(52) U.S. Cl.
CPC ............ G06F 8/433 (2013.01); G06F 8/24 (2013.01); H04L 67/34 (2013.01)

(58) Field of Classification Search
CPC ............ G06F 8/433; G06F 8/24; H04L 67/34
USPC .................................................. 717/120–167
See application file for complete search history.

(56) References Cited

U.S. PATENT DOCUMENTS

| | | | |
|---|---|---|---|
| 9,411,558 B2* | 8/2016 | Hutchison | G06F 3/0673 |
| 9,690,553 B1* | 6/2017 | Brodie | G06F 8/433 |
| 10,387,223 B2 | 8/2019 | Nadig et al. | |
| 2004/0049372 A1* | 3/2004 | Keller | H04L 43/091 |
| | | | 703/22 |
| 2004/0168152 A1* | 8/2004 | Kramer | G06F 8/71 |
| | | | 717/170 |
| 2007/0130073 A1* | 6/2007 | Celli | G06F 21/121 |
| | | | 705/51 |
| 2008/0086632 A1* | 4/2008 | Kagle | H04L 9/00 |
| | | | 713/150 |
| 2015/0039505 A1* | 2/2015 | Jin | G06Q 30/04 |
| | | | 705/44 |

(Continued)

OTHER PUBLICATIONS

Zeller, Andreas. "Isolating cause-effect chains from computer programs." ACM SIGSOFT Software Engineering Notes 27.6 (2002): pp. 1-10. (Year: 2002).*

(Continued)

*Primary Examiner* — Satish Rampuria
(74) *Attorney, Agent, or Firm* — Paradice & Li LLP

(57) ABSTRACT

Capturing dependencies between variables using a variable agnostic object is disclosed. A system is configured to obtain an indication of a first dependency of a first variable to a second variable via a programming interface and depict the first dependency, the first variable, and the second variable in a first instance of a variable agnostic object in a source code. The system is also configured to obtain an indication of a second dependency of a third variable to a fourth variable via the programming interface and depict the second dependency, the third variable, and the fourth variable in a second instance of the variable agnostic object in the source code. The system is also configured to compile the source code to generate a computer-executable program capturing the first dependency and the second dependency based on the first instance and the second instance of the variable agnostic object.

18 Claims, 8 Drawing Sheets

(56) References Cited

U.S. PATENT DOCUMENTS

2018/0121026 A1 5/2018 Nadig et al.
2020/0285452 A1* 9/2020 Azuma ................... G06F 8/433
2020/0319867 A1* 10/2020 Ballard ..................... G06F 8/24

OTHER PUBLICATIONS

Ferrante, Jeanne, Karl J. Ottenstein, and Joe D. Warren. "The program dependence graph and its use in optimization." ACM Transactions on Programming Languages and Systems (TOPLAS) 9.3 (1987): pp. 319-349. (Year: 1987).*
Ottenstein, Karl J., and Linda M. Ottenstein. "The program dependence graph in a software development environment." ACM Sigplan Notices 19.5 (1984): pp. 177-184. (Year: 1984).*
Martin, Michael, Benjamin Livshits, and Monica S. Lam. "Finding application errors and security flaws using PQL: a program query language." Acm Sigplan Notices 40.10 (2005): 365-383. (Year: 2005).*
Armstrong, Joe. Making reliable distributed systems in the presence of software errors. Diss. 2003.pp. 1-295 (Year: 2003).*
Campbell, Roy H., et al. "Designing and implementing Choices: An object-oriented system in C++." Communications of the ACM 36.9 (1993): 117-126. (Year: 1993).*

* cited by examiner

800

```
┌─────────────────────────────────────────────────────────────────┐
│ Obtain an indication of a first dependency of a first variable  │
│ to a second variable via a programming interface.  802          │
└─────────────────────────────────────────────────────────────────┘
                                │
                                ▼
┌─────────────────────────────────────────────────────────────────┐
│ Depict the first dependency, the first variable, and the second │
│ variable in a first instance of a variable agnostic object in a │
│ source code.  804                                               │
└─────────────────────────────────────────────────────────────────┘
                                │
                                ▼
┌─────────────────────────────────────────────────────────────────┐
│ Obtain an indication of a second dependency of a third variable │
│ to a fourth variable via the programming interface.  806        │
└─────────────────────────────────────────────────────────────────┘
                                │
                                ▼
┌─────────────────────────────────────────────────────────────────┐
│ Depict the second dependency, the third variable, and the       │
│ fourth variable in a second instance of a variable agnostic     │
│ object in the source code.  808                                 │
└─────────────────────────────────────────────────────────────────┘
                                │
                                ▼
┌─────────────────────────────────────────────────────────────────┐
│ Compile, by a compiler, the source code to generate a computer- │
│ executable program capturing the first dependency and the       │
│ second dependency.  810                                         │
└─────────────────────────────────────────────────────────────────┘
```

Figure 8

CAPTURING VARIABLE DEPENDENCIES USING A VARIABLE AGNOSTIC OBJECT

TECHNICAL FIELD

This disclosure relates generally to programming interfaces, including variable agnostic objects of a programming interface for capturing dependencies between variables.

DESCRIPTION OF RELATED ART

Many business provide a bundle of services, software packages, or other end products to customers. For example, some companies (such as Google® and Microsoft®) provide one or more products of a suite of business productivity software (such as document processing, spreadsheet processing, presentation creation, database management, etc.) to customers. In another example, insurance firms provide a bundle of different insurance policies (such as car insurance, home insurance, personal insurance, etc.) to customers. Many products are dependent on one another. For example, a user may need a basic license to a work productivity suite before subscribing to add on messaging or video chat capabilities to the work productivity suite software.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for capturing one or more dependencies between variables using a variable agnostic object of a programming interface. The example method includes obtaining an indication of a first dependency of a first variable to a second variable via a programming interface. The method also includes depicting the first dependency, the first variable, and the second variable in a first instance of a variable agnostic object in a source code. The method further includes obtaining an indication of a second dependency of a third variable to a fourth variable via the programming interface. The method also includes depicting the second dependency, the third variable, and the fourth variable in a second instance of the variable agnostic object in the source code. The method further includes compiling, by a compiler, the source code to generate a computer-executable program capturing the first dependency and the second dependency.

Another innovative aspect of the subject matter described in this disclosure can be implemented in a system for capturing one or more dependencies between variables using a variable agnostic object of a programming interface. An example system includes one or more processors and a memory storing instructions that, when executed by the one or more processors, cause the system to perform operations. The operations include obtaining an indication of a first dependency of a first variable to a second variable via a programming interface. The operations also include depicting the first dependency, the first variable, and the second variable in a first instance of a variable agnostic object in a source code. The operations further include obtaining an indication of a second dependency of a third variable to a fourth variable via the programming interface. The operations also include depicting the second dependency, the third variable, and the fourth variable in a second instance of the variable agnostic object in the source code. The operations further include compiling, by a compiler, the source code to generate a computer-executable program capturing the first dependency and the second dependency.

Another innovative aspect of the subject matter described in this disclosure can be implemented as a computer-implemented method for executing a program based on one or more dependencies between variables captured by a variable agnostic object of a programming interface. An example method includes obtaining a user indication to perform an operation associated with managing a first product or service. The example method also includes determining, based on the first product or service, whether at least one dependency of the first product or service on another product or service exists via a program executed by the system. The program captures one or more dependencies based on one or more instances of a variable agnostic object, the program is a product of a compiler compiling a source code, and, for each of the one or more dependencies, the source code includes a depiction of the dependency via an instance of the one or more instances of the variable agnostic object.

Another innovative aspect of the subject matter described in this disclosure can be implemented in a system for executing a program based on one or more dependencies between variables captured by a variable agnostic object of a programming interface. An example system includes one or more processors and a memory storing instructions that, when executed by the one or more processors, cause the system to perform operations. The operations include obtaining a user indication to perform an operation associated with managing a first product or service. The operations also include determining, based on the first product or service, whether at least one dependency of the first product or service on another product or service exists via a program executed by the system. The program captures one or more dependencies based on one or more instances of a variable agnostic object, the program is a product of a compiler compiling a source code, and, for each of the one or more dependencies, the source code includes a depiction of the dependency via an instance of the one or more instances of the variable agnostic object.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 8 shows an illustrative flow chart depicting an example operation for capturing one or more dependencies between variables using a variable agnostic object of a programming interface, according to some implementations.

Like numbers reference like elements throughout the drawings and specification.

DETAILED DESCRIPTION

Figure 1:
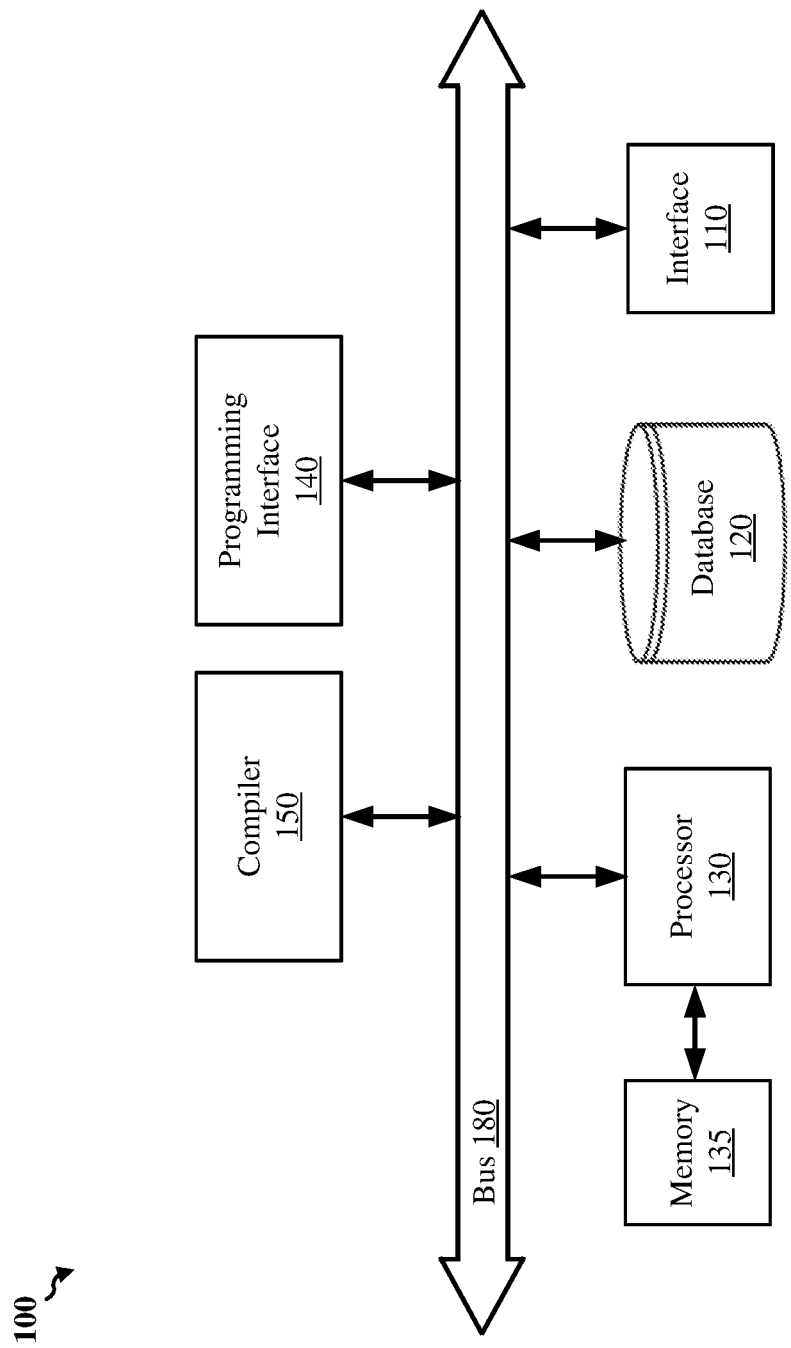
FIG. 1 shows an example system for capturing one or more dependencies between variables using a variable agnostic object of a programming interface, according to some implementations.

Implementations of the subject matter described in this disclosure may be used in capturing dependencies between variables, such as capturing dependencies between customer offered services or products, using one or more variable agnostic objects in a programming interface. Aspects of the present disclosure are regarding a variable agnostic object used to define dependencies in software. Conventionally, dependencies between variables are hardcoded into the source code of a software application. For example, a plurality of conditional statements calling out explicit variables are used to define specific dependencies and the actions performed as a result of the dependencies. Dependencies are also repeated throughout different portions of the source code, with each requiring its own hardcoding. When changes to the dependencies are to occur, large portions of the source code may be required to be rewritten to revise and review all of the hardcoded conditional statements for the dependencies. A variable agnostic object is a generic object in software used to define dependencies between variables without requiring hardcoding of the dependencies. One or more software libraries may define a variable agnostic object to define a plurality of dependencies without requiring multiple instances of hardcoding the dependency. An instance of the variable agnostic object may be used to define a specific dependency between objects or other variables. In this manner, when the dependency is needed in the source code, that object instance may be called instead of requiring separate hardcoding of the dependencies for each occurrence of the dependency.

Regarding a variable agnostic object's application, many companies offer different bundles or a variety of products or services to customers. For example, Microsoft® offers the Office Suite to business and personal users. The Office Suite may include one or more work productivity tools, such as document processing, spreadsheet processing, presentation generation, database management, visual design tools, instant messaging and chat. In another example, Intuit® offers various financial management tools to business and personal users. The management tools may include an accounting tool (e.g., QuickBooks®), a payroll tool (e.g., QuickBooks® Payroll), and an inventory and order management tool (e.g., QuickBooks® Commerce). Products or services may be offered as software on a users' local computer or software as a service (SaaS) for which the software may be hosted on a remote server, in a cloud computing environment, or otherwise remotely to the user. In a further example, an insurance company may offer various insurance products and investment vehicles, such as life insurance, home insurance, auto insurance, personal liability insurance, and annuities. Sales and management of policies and investment vehicles may be provided online.

Some products or services are dependent upon one or more other products or services. For example, an insurance company may require a customer to have home insurance with the company before the customer may have personal liability insurance. In another example, Microsoft® may require a base subscription including a core of work productivity tools before a customer can add a graphic design tool subscription. In a further example, Intuit® may require a subscription to QuickBooks® before a customer can add a QuickBooks® Commerce subscription.

Management of the products or services may be performed automatically via software including an online portal or other user interface with the customer. For example, a customer may access his or her account on a company's system via a web browser on the user's personal computer in order to subscribe, unsubscribe, convert a trial subscription to a paid subscription, or convert between a free version and a paid version for one or more products or services. The dependencies between products or services need to be defined in the system software to prevent the user from attempting an action violating the required dependencies. For example, if a user accesses an Intuit® system to attempt to cancel or pause a QuickBooks® subscription while a QuickBooks® Commerce subscription remains active, the system software needs to be configured to cause the system to prevent such cancellation and/or to cause the system to warn the user that both subscriptions need to be cancelled or paused.

Conventionally, dependencies between products are hardcoded into the source code of a system's software. In this manner, each instance of a product dependency is explicitly defined in the source code by programmers via a programming interface, and the source code is compiled so that the executable software captures the dependencies between products for interfacing with users. The number of products or services offered by different companies continues to grow. In addition, products may be combined into one product or a product may be split into multiple products over time. Furthermore, a product's dependency may change over time such that the product becomes independent of other products or that the product is now dependent on a product different from the original product from which it depended. As a result, the dependencies between products change over time. Conventionally, the source code is rewritten to account for any dependency changes or any changes to be made to the program in general and is recompiled.

As the system software becomes more sophisticated, the time and resources to rewrite the source code to account for a change in dependencies or to the program exponentially grows. In addition, as the number of products increases, the frequency at which the source code is to be rewritten also increases. Furthermore, the exercise of capturing dependencies in the software must be manually performed anew for any new batch of products or services separate from existing products. For example, a company may offer insurance products with some dependencies and investment vehicles with some other dependencies. The insurance products may be managed by a user using one portion of a software program, and the investment vehicles may be managed by the user using a different portion of the software program. Each class of product dependencies are required to be hardcoded into the source code for the different portions of the software program. Hardcoded specific dependencies for specific products are not replicable for different dependencies. As a result, each dependency requires a burdensome amount of time and resources to be coded into the software. As such, there is a need to capture dependencies between products or services that is easily reproducible for any type of dependency and for any products or service to allow easier management of the program used to manage the products or services.

Various implementations of the subject matter disclosed herein provide one or more technical solutions to the technical problem of capturing one or more dependencies between one or more products in software (or other types of variables) by using a variable agnostic object in a programming interface. A variable agnostic object may be used in place of hardcoding each dependency to allow easier revisions and scaling of software to meet current needs.

Various aspects of the present disclosure provide a unique computing solution to a unique computing problem that did not exist prior to object-oriented programming and computer-executed software. As such, implementations of the subject matter disclosed herein are not an abstract idea such as organizing human activity or a mental process that can be performed in the human mind. Programming, compiling, and executing computer-executable software cannot be performed in the human mind, much less using pen and paper.

FIG. 1 shows an example system 100 for capturing one or more dependencies between variables using a variable agnostic object of a programming interface, according to some implementations. The system 100 includes an interface 110, a database 120, a processor 130, a memory 135 coupled to the processor 130, a programming interface 140, and a compiler 150. In some implementations, the various components of the system 100 may be interconnected by at least a data bus 180, as depicted in the example of FIG. 1. In other implementations, the various components of the system 100 may be interconnected using other suitable signal routing resources.

The interface 110 may be one or more input/output (I/O) interfaces to receive data from or provide data to one or more other devices or systems. An example interface may include a wired interface or wireless interface to the internet or other means to communicably couple with user devices or other suitable devices. For example, the interface 110 may include an interface with an ethernet cable to a modem, which is used to communicate with an internet service provider (ISP) directing traffic to and from user devices or other party devices. The interface 110 may also be used to communicate with another device within the network to which the system 100 is coupled. As used herein, communicating with a "user" or receiving/providing traffic from/to a "user" may refer to communicating with the user's device (such as a smartphone, tablet, personal computer, or other suitable electronic device). The interface 110 may also include a display, a speaker, a mouse, a keyboard, or other suitable input or output elements that allow interfacing with the system 100 by a local user or moderator. For example, the interface 110 includes a display and input means (such as a keyboard and mouse) for a programmer to interact with a graphical user interface (GUI) of the system 100. The GUI may be configured to allow the programmer to access the programming interface 140 in order to generate source code capturing the dependencies between variables, which is to be compiled and executed by the system 100 or by another suitable system.

The database 120 may store source code generated by the system 100 (such as by a programmer using the programming interface 140), compiled executable software, and other information or programs of the system 100. For information stored on the database 120, the database 120 may include a relational database capable of presenting the information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. The memory 135 may also store source code before being compiled or other suitable information. In some implementations, hardwired circuitry may be used in place of, or in combination with, software instructions to implement aspects of the disclosure. As such, implementations of the subject matter disclosed herein are not limited to any specific combination of hardware circuitry and/or software.

The programming interface 140 includes any suitable interface for generating source code. In some implementations, the programming interface 140 includes one or more programs executed by the system 100 (such as the processor 130) to allow a programmer to enter source code that is to be compiled into one or more executable programs. The programmer may access the programs via a display and other devices of the interface 110. As used herein, source code refers to any suitable code (such as in human readable format) before compilation by the compiler 150. The source code may be text in any suitable format readable by the compiler 150, such as JavaScript Object Notation (JSON), Java, Python, or any other programming language for generating the one or more programs.

The compiler 150 includes any suitable program for compiling the source code into one or more executable programs by the system 100. In some implementations, the compiler 150 translates higher level source languages (such as source code written in JSON or Python) into a lower level machine readable language (which may be in a binary format). To translate the source code, the compiler 150 may be associated with one or more libraries to define terms in the higher language for conversion to a lower language. The terms include objects for object oriented programming and the operations to be included in the objects. Based on the source language, the libraries may also define headers or other components of the source language for translation to the machine readable language.

The system 100 is used in the below examples of capturing dependencies between variable using a variable agnostic object in the programming interface. Conventionally, dependencies between variables are hardcoded into the source code. For example, a plurality of conditional statements calling out explicit variables are used to define specific dependencies and the actions performed as a result of the dependencies. Dependencies are also repeated throughout different portions of the source code, with each requiring its own hardcoding. When changes to the dependencies are to occur, large portions of the source code may be required to be rewritten to revise and review all of the hardcoded conditional statements for the dependencies.

For the system 100, one or more libraries define a variable agnostic object to define dependencies without requiring multiple instances of hardcoding the dependency. An instance of the variable agnostic object may be used to define a specific dependency between objects. In this manner, when the dependency is needed in the source code, that object instance may be called instead of requiring separate hardcoding of the dependencies. As used herein, a dependency refers to a variable depending on another variable (with variables being defined in the source code, such as in a variables object file or catalog) in order to perform one or more operations on the dependent variable. In a specific example, the variables are associated with products or services offered to customers (which may be referred to as the variables being or including the products or services). For example, Intuit® products include QuickBooks® (QBO), QBO Payroll (QBOP), and QBO Commerce (QBOC), and each product may be associated with a variable in the source code. The example variables/products are referred to in the examples herein as QBO, QBOP, and QBOC, which may be defined in a variable object file or catalog.

Example operations associated with QBO, QBOP, and QBOC in managing the products include activating a subscription to the product, deactivating an active subscription to the product, or converting a trial subscription to a paid subscription to the product. As used herein, activating a subscription may include activating a paid subscription, activating a free subscription, activating a trial subscription, activating one of different tiers of a subscription, or renewing a subscription. Activation may be of a new subscription or previous subscription. Deactivating an active subscription may include canceling an active subscription, pausing an active subscription, otherwise placing an active subscription into an inactive state, or preventing an automatic renewal of an active subscription. As used herein, an active subscription refers to a permanent subscription, a renewing subscription, a trial subscription during the trial phase (such as after a user opts-in to a trial subscription to the product for a defined amount of time), or any other subscription type for which the user has rights to use to associated product or service.

The compiler 150 compiles the source code into computer-executable software (referred to herein as a program). The program, when executed by a system (such as the system 100 or a different system), allows a user to manage the products or services for his or her account. For example, a user device connects to a system executing the program (such as via a web browser or dedicated application to reach a portal at the system). The user may then access his or her account to manage products that are offered or may be offered to the user. For example, a user may login to his or her account via a GUI to activate or deactivate a subscription to one or more products, including QBO, QBOP, and QBOC. Activating or deactivating subscriptions to QBO, QBOP, or QBOC may be dependent on subscriptions to one or more of the other products. For example, in order to have an active subscription to QBOP, a user may be required to have an active subscription to QBO. Therefore, the program is to account for such dependencies when attempting to perform the user requested operation. The program is configured to perform a dependency check to ensure no dependencies prevent the program from initiating execution of the desired operation, which is described in more detail below.

Through use of a variable agnostic object, each dependency to be checked in the program may be captured by an instance of the object in the source code. In this manner, the object instance may be called for a dependency check instead of having hardcoded all of the intricacies of each dependency check into the source code. Specific example dependencies between QBO, QBOP, and QBOC are provided in more detail below as example dependency rules included in one or more libraries associated with a variable agnostic object to be used to compile the source code including the objects. In this manner, when the source code is compiled, the dependencies are captured via use of the variable agnostic object and dependency rules associated with the object.

Figure 2:
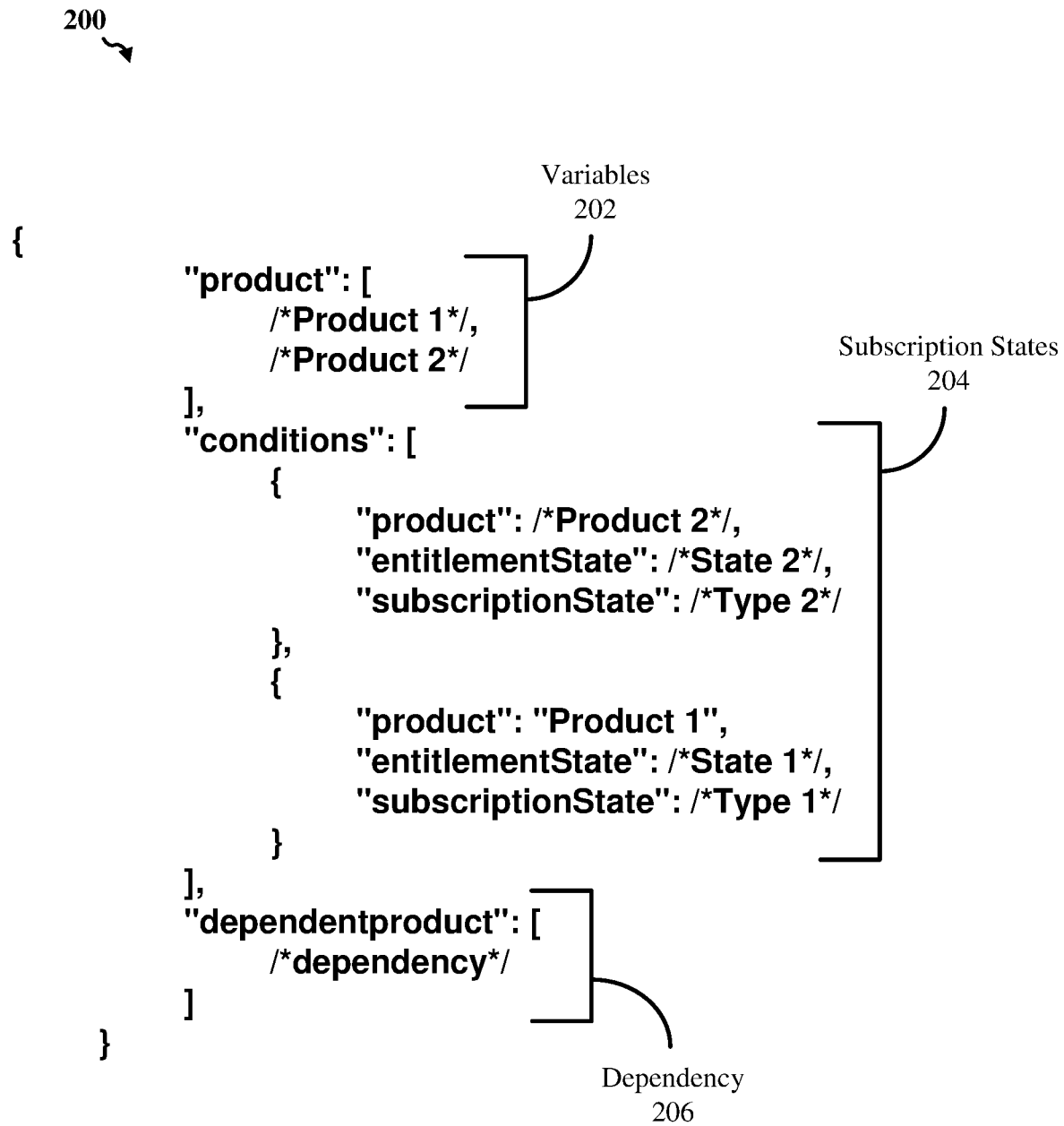
FIG. 2 shows an example depiction of a variable agnostic object, according to some implementations.

FIG. 2 shows an example depiction of a variable agnostic object 200, according to some implementations. The variable agnostic object is depicted in JSON format, but any suitable language may be used. The example variable agnostic object 200 includes the variables 202 for which a dependency is to be captured, the subscription states 204 of the variables associated with a dependency to be captured, and the dependency 206 defined to be associated with the variables 202 and the subscription states 204 of the variables. The components 202, 204, and 206 may be manually defined by the programmer for an instance of the object 200 to depict an intended dependency between variables.

The example variable agnostic object 200 depicts a dependency between a "Product 1" and a "Product 2". As shown, the variables 202 include a Product 1 and a Product 2. As used herein, including the example object 200 in FIG. 2, the markings /* and */ denote a placeholder for a variable or term. In some implementations, /*Product 1*/ may be a placeholder for one of QBO, QBOP, or QBOC, and /*Product 2*/ may be a placeholder for a different one of QBO, QBOP, or QBOC. However, any suitable variables (such as other products or services) may be used.

The subscription states 204 (also denoted as "conditions" in the variable agnostic object 200) indicates a present subscription state of Product 1 and Product 2 to which the dependency 206 applies. As shown, Product 1 is associated with a State 1 (also referred to as a first entitlementState) and a Type 1 (also referred to as a first subscriptionState). For the above example products QBO, QBOP, and QBOC, State 1 includes whether the subscription is "ACTIVE" or "INACTIVE," Type 1 includes whether the subscription is "PAID" or "TRIAL," State 2 includes whether the subscription is "ACTIVE" or "INACTIVE," and Type 2 includes whether the subscription is "PAID" or "TRIAL." In some implementations, the type may be other values, such as "TRIAL_OPTED_IN" (indicating a trial subscription opted into during signup or other activity phase), "PENDINGCANCEL" (indicating a subscription that is pending cancellation, such as indicating a subscription is not to be renewed at the end of its current term), or "IN_COLLECTION" (indicating that payment to the subscribed product is overdue).

For one or more combinations (such as for each combination) of Product 1, State 1, Type 1, Product 2, State 2, and Type 2, an instance of the variable agnostic object may be included in the source code to depict any dependency between the products associated with the combination. Dependency 206 (also denoted as "dependentproduct" in the object 200) indicates whether either one of Product 1 or Product 2 is dependent on the other product. The term "dependency" indicates the product to which the other product is dependent. For example, if "dependency" is QBO for Product 1 being QBO and Product 2 being QBOC, the variable agnostic object 200 depicts that QBOC is dependent on QBO for the specific combination of State 1, Type 1, State 2, and Type 2. If no dependency exists for the specific combination and for the requested operation, "dependency" may be "null" or otherwise indicate that no dependency exists for the specific scenario. A dependency may exist both ways between products. In this manner, the dependency 206 may include neither, one of, or both of Product 1 and/or Product 2.

For products QBO and QBOP, example dependency rules for different combinations of states and types that may be in one or more libraries are provided below in a visual format in Table 1. A dependency rule may indicate the operations affected by the dependency (such as which operations are allowed or prevented or which operations are adjusted based on the dependency).

TABLE 1

| Rule | Product 1 Product 2 | Status 1 Status 2 | Type 1 Type 2 | Dependency | Operation effect based on dependency |
|---|---|---|---|---|---|
| 1 | QBO QBOP | ACTIVE ACTIVE | TRIAL TRIAL | QBOP null | 1. Bulk opt-in: For a bulk experience, provide the option to remove/add QBOP. |
| 2 | QBO QBOP | ACTIVE INACTIVE | IN_COLLECTION TRIAL (cancel) | null QBO | 1. Request update payment information for QBO. 2. QBOP opt-in: Block opt-in request, provide that an opt-in requires a paid subscription to QBO. |
| 3 | QBO QBOP | ACTIVE ACTIVE | TRIAL OPTED IN TRIAL | null null | 1. Opt-in QBOP: allowed 2. Opt-out QBO: allowed |
| 4 | QBO QBOP | ACTIVE ACTIVE | TRIAL OPTED IN TRIAL OPTED IN | QBOP null | 1. Opt-out QBOP: allowed 2. Bulk Opt-out: allowed |
| 5 | QBO QBOP | ACTIVE INACTIVE | TRIAL OPTED IN TRIAL (cancel) | null QBO | 1. Opt-out QBO: allowed 2. QBOP resubscribe: Block QBOP resubscribe, provide that requires a paid subscription to QBO. |
| 6 | QBO QBOP | ACTIVE ACTIVE | PAID TRIAL | QBOP null | 1. Opt-in QBOP: allowed 2. QBO cancel auto renew: Block, provide that cannot block since QBOP is active |
| 7 | QBO QBOP | ACTIVE ACTIVE | PAID TRIAL OPTED IN | QBOP null | 1. Opt-out QBOP: allowed 2. QBO cancel auto renew: Block, provide that cannot block since QBOP is active |
| 8 | QBO QBOP | ACTIVE INACTIVE | PAID TRIAL (cancel) | null null | 1. QBOP resubscribe: allowed 2. QBO cancel auto renew: allowed |
| 9 | QBO QBOP | ACTIVE ACTIVE | PAID PAID | QBOP null | 1. QBOP cancel auto renew followed by QBO cancel auto renew: allowed 2. QBOP only cancel auto Renew: allowed |
| 10 | QBO QBOP | ACTIVE ACTIVE | PAID PENDING CANCEL | null null | 1. QBOP resume: allowed 2. QBO cancel auto renew: allowed |
| 11 | QBO QBOP | ACTIVE INACTIVE | PAID PAID | null null | 1. QBOP resubscribe: allowed 2. QBO cancel auto renew: allowed |
| 12 | QBO QBOP | ACTIVE ACTIVE | PENDING CANCEL TRIAL | null null | ! Not a valid scenario. (QBOP cannot be active when QBO is in Pending Cancel) |
| 13 | QBO QBOP | ACTIVE INACTIVE | PENDING CANCEL TRIAL | null QBO | 1. Revoke QBO: allowed 2. QBOP resubscribe: Block, provide that QBOP resubscribe requires a paid subscription to QBO |
| 14 | QBO QBOP | ACTIVE ACTIVE | PENDING CANCEL TRIAL OPTED IN | null null | ! Not a valid scenario. (QBOP cannot be active when QBO is in Pending Cancel) |
| 15 | QBO QBOP | ACTIVE ACTIVE | PENDING CANCEL PENDING CANCEL | null QBO | 1. QBO only reinstate followed by QBOP only reinstate: allowed |
| 16 | QBO QBOP | ACTIVE INACTIVE | PENDING CANCEL PAID | null QBO | 1. Revoke QBO: allowed 2. QBOP resubscribe: Block, provide that QBOP resubscribe requires a paid subscription to QBO |
| 17 | QBO QBOP | ACTIVE ACTIVE | IN_COLLECTION TRIAL | null QBO | 1. Update Payment: allowed 2. QBOP opt-in: Block, provide that QBOP opt-in requires a paid subscription to QBO |

TABLE 1-continued

| Rule | Product 1<br>Product 2 | Status 1<br>Status 2 | Type 1<br>Type 2 | Dependency | Operation effect based on dependency |
|---|---|---|---|---|---|
| 18 | QBO<br>QBOP | ACTIVE<br>ACTIVE | IN_COLLECTION<br>TRIAL (cancel) | null<br>QBO | 1. QBO Update Payment: allowed<br>2. QBOP opt-in: Block, provide that QBOP opt-in requires a paid subscription to QBO |
| 19 | QBO<br>QBOP | ACTIVE<br>ACTIVE | IN_COLLECTION<br>IN_COLLECTION | null<br>null | |
| 20 | QBO<br>QBOP | INACTIVE<br>INACTIVE | TRIAL<br>TRIAL | QBOP<br>QBO | 1. QBO only resubscribe: allowed<br>2. Bulk resubscribe: allowed |
| 21 | QBO<br>QBOP | INACTIVE<br>INACTIVE | PAID<br>TRIAL | QBOP<br>QBO | 1. QBO only resubscribe: allowed<br>2. Bulk resubscribe: allowed |
| 22 | QBO<br>QBOP | INACTIVE<br>INACTIVE | PAID<br>PAID | QBOP<br>QBO | 1. QBO only resubscribe: allowed<br>2. Bulk resubscribe: allowed |
| 23 | QBO<br>QBOP | ACTIVE<br>ACTIVE | TRIAL<br>TRIAL | QBOP<br>null | 1. QBOP cancel trial: allowed<br>2. Bulk cancel trial: allowed |

Table 1 may include additional rows for additional products, states or types, with each row being a dependency rule. The dependency rules may be coded in the one or more libraries associated with the variable agnostic object. In this manner, the variable agnostic object may be called in the source code instead of hardcoding the dependency each time it is required. In addition, if any changes, additions, or subtractions to the dependencies are to be made, the libraries incorporating the dependency rules may be updated (such as by updating the terms in an affected dependency rule) and only the instances of the variable agnostic object associated with the affected dependency rule may be added to, removed from, or otherwise adjusted in the source code instead of rewriting the source code to accommodate the changes in the dependencies. Without requiring a complete rewrite of large portions of the source code, use of a variable agnostic object allows for easy scaling of programs to accommodate large changes in dependencies.

For example, an output of the variable agnostic object 200 is the content of the "dependentproducts" for the specific "product" of interest having the current "conditions." If the variables 202 ("product") are QBO and QBOP, an instance of the variable agnostic object 200 may exist for the current combination of the state and type of QBO and QBOP for the user (such as the current subscription status to QBO and QBOP). In response to obtaining a requested operation on a product from a user (such as canceling a subscription to QBO), for the instance of the variable agnostic object 200 including the matching "product" of QBO and QBOP and "conditions" of the current subscription states for QBO and QBOP, the variable agnostic object 200 may return the contents of the "dependentproducts" indicating whether QBO is dependent on QBOP, QBOP is dependent on QBO, neither, or both. A subscription definitions object or catalog may be called to define the actions that are allowed, prevented, or to be modified for managing the products contained in the "dependentproducts" returned by the variable agnostic object 200. In this manner, a requested operation (such as canceling a subscription to a product) may be compared to the operations defined in the portion of the subscription definitions object or catalog associated with the specific instance of the variable agnostic object 200. The comparison may thus be used to determine if the operation is allowed, prevented, or to be modified or performed in a specific manner based on the dependency indicated by the instance of the variable agnostic object 200. If an operation is requested for one product, all instances of the variable agnostic object 200 including the one product in the variables 202 may be reviewed for determining more than one dependent product. For example, requesting cancellation of a subscription to QBO may cause a review of all instances of the variable agnostic object 200 including variables 202 of QBO and QBOP or QBO and QBOC that having matching subscription states 204 to the current subscription states for the user. In this manner, more than one product may be a dependent product (such as both QBOP and QBOC) to the target product (which is QBO in the above example).

In some implementations, operation flows for specific operations that may be requested are defined for reviewing the dependencies depicted by the variable agnostic objects. For the defined operation flows, a dependency may be indicated by a variable agnostic object, and the indicated dependency is used in the operation flow to determine whether the operation is to be performed. For example, in describing rule 1, the status and type of both QBO and QBOP are ACTIVE and TRIAL. QBO is dependent on QBOP for this specific combination regarding the operation of bulk opt-ins. As used herein, a bulk opt-in refers to an opt-in to a subscription for a bundle of products. Opt-in refers to converting a trial subscription to a paid subscription. QBO is a base program, and QBOP may be an add-on program to QBO. If the user indicates a bulk opt-in is to be performed (such as for a bundle of programs including converting the trial subscription to a paid subscription for QBO), the instance of the variable agnostic object matching the products and subscription states associated with the operation is identified. The output of the object instance indicating a dependency is used to determine the restrictions or allowances to the operation based on a subscription definitions or other dependency catalog (which may include encodings of the dependency rules for the products, e.g., the operation effect rules in Table 1). For a bulk opt-in operation from the previous example where both subscriptions to QBO and QBOP are active trials, the bulk opt-in operation is adjusted such that the system may query the user as to whether the user wishes to add QBOP (convert the trial subscription to a paid subscription) or remove QBOP (cancel the trial subscription). As can be seen from Table 1, the effects of Rule 1 (as well as the other dependency rules in Table 1) on an operation may be based on the operation as well as the combination of products, states, and types. In this manner, when an operation is requested, the operation may be used to check if any dependency rules exist for the operation and the current combination of products associated with the operation and the states and types of the products. In one implementation of a dependency rule, if no effect to the operation occurs, the dependency rule associated with the operation and combination of products, states, and types may be defined as the operation is to be performed as normal (such as indicating the operation is "allowed"). In another implementation, if the operation is not listed (visually depicted as not being included in the "operation effect" cell) for the associated dependency rules of the specific combination of products, states, and types, the system may determine that the operation is prevented from being performed. From the listed operations, the system may then determine whether the requested operation is allowed (or otherwise affected) by the dependency rules. Alternatively, the operation not being listed may indicate that the operation is allowed to be performed. In one implementation of the dependency rules for Table 1, any cells of the operation effect column that are empty may indicate that no operations are allowed for the associated combination of products, states, and types for the cell. Alternatively, any cells of the operation effect column that are empty may indicate that no operations are prevented are otherwise affected by the associated combination of products, states, and types for the cell. In this manner, a dependency rule may indicate which operations are allowed or otherwise indicate that one or more operations are not affected by a specific combination of products, states, and types. To note, the dependency rules may be embodied in one or more libraries (such as one or more objects or catalogs) associated with the variable agnostic object to capture the dependencies and their effects on the requested operations.

As shown in Table 1, most dependency rules indicate which operations are allowed for a specific combination of products, states, and types. Some dependency rules indicate that the specific combination of products, states, and types are invalid. In some implementations, such rules are not included in the one or more libraries. Alternatively, such rules are included to cause an error handling operation in case the invalid combination of products, states, and types occurs. For example, the system executing the program may perform a reset of the program, other data handling operation to clear the combination, or may flag the account for manual review in response to such rule being triggered as a result of the search for the operation and combination of products, states, and types. Any implementation of the dependency rules based on the specific combinations of products, states, and types may be performed, as Table 1 is just a visual example of some dependency rules provided for clarity. As used herein, a product's state may refer to both the state and type for the product. Additionally, a user requested operation to be performed for one or more products or services may be referred to herein as a user action.

Each combination of variables (e.g., products), states, and types may be associated with an instance of the variable agnostic object (with the variables and states filled in for each combination). With each dependency rule in Table 1 being associated with a unique combination of states and types (which may be expanded to a unique combination of products, states, and types for more than two products), each dependency rule may be associated with a specific variable agnostic object instance. In this manner, each specific instance of the variable agnostic object may be associated with a dependency rule included in the libraries used for compiling the source code including the variable agnostic objects.

As noted in Table 1 and the above examples, some of the operations served through use of the variable agnostic objects for dependent products (and thus associated with the dependency rules) includes "opt-in" to a product (convert a trial subscription to a paid subscription), "cancel" a product subscription (cancel a trial subscription or a paid subscription), and "resubscribe" to a product (convert a subscription from an inactive state to an active state). Such operations may be requested by a user (such as via a GUI used to access his or her account). In some implementations, the user may click a button or otherwise indicate via the GUI that one of the operations (user action) is to be performed for one or more products.

Figure 3:
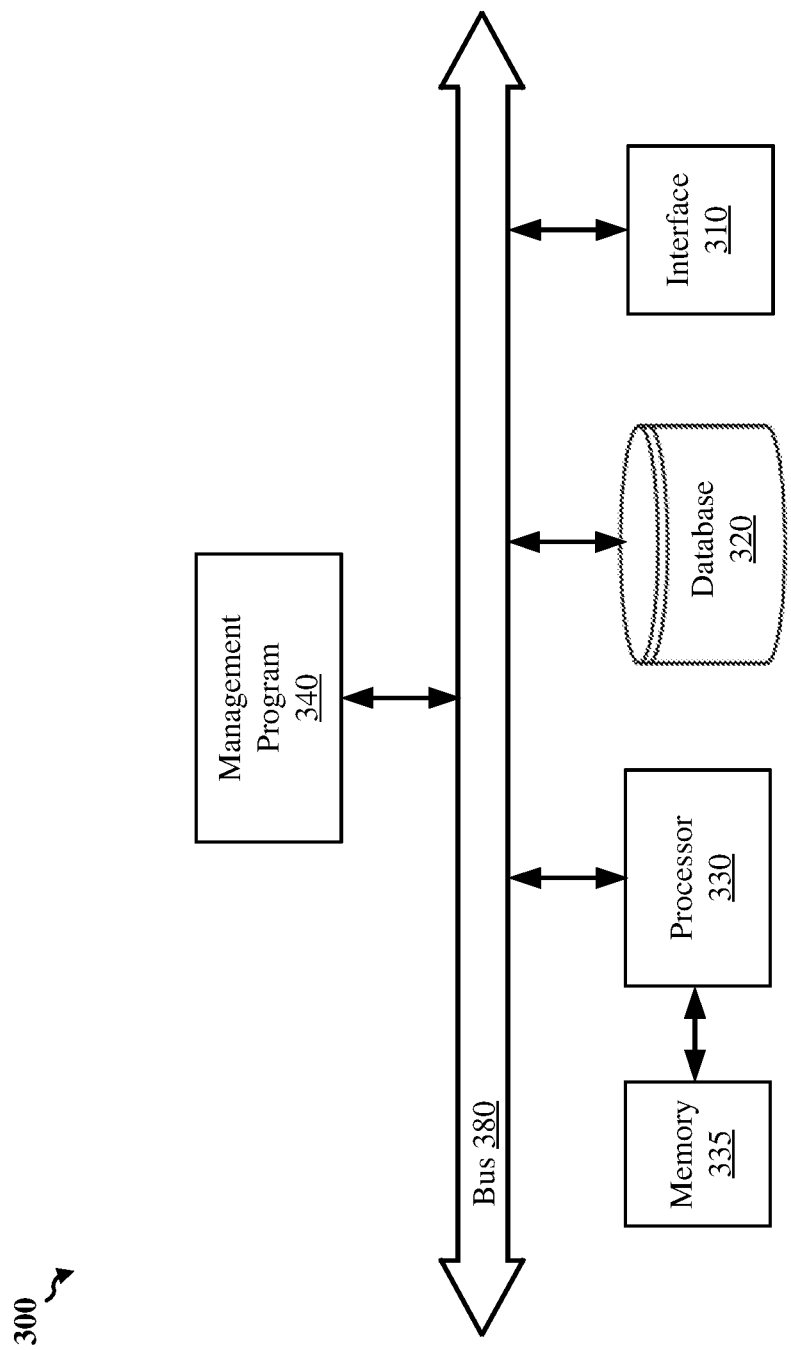
FIG. 3 shows an example system for managing one or more products or services for a user, according to some implementations.

As noted above, any suitable system may execute the program to determine whether to execute the user action (and whether any adjustments should be made to the user action). FIG. 3 shows an example system 300 for managing one or more products or services for a user, according to some implementations. The example system 300 is used in the below examples to describe aspects of managing the one or more products or services (such as whether to perform a user action for a product, such as opt-in, cancel, or resubscribe, based on a dependent product).

The system 300 includes an interface 310, a database 320, a processor 330, a memory 335 coupled to the processor 330, and a management program 340. In some implementations, the various components of the system 300 may be interconnected by at least a data bus 380, as depicted in the example of FIG. 3. In other implementations, the various components of the system 300 may be interconnected using other suitable signal routing resources.

The interface 310 may be one or more input/output (I/O) interfaces to receive data from or provide data to one or more other devices or systems. An example interface may include a wired interface or wireless interface to the internet or other means to communicably couple with user devices or other suitable devices. For example, the interface 310 may include an interface with an ethernet cable to a modem, which is used to communicate with an internet service provider (ISP) directing traffic to and from user devices or other party devices. The interface 310 may also be used to communicate with another device within the network to which the system 300 is coupled. Additionally or alternatively, the interface 310 may include a display, a speaker, a mouse, a keyboard, or other suitable input or output elements that allow interfacing with the system 300 by a user. For example, the system 300 executes the program generated by the system 100 (by compiling the source code including the variable agnostic object) to manage the products or services. The system 300 may be a remote system to the user (such as a server or cloud computing for the company offering the products or services) or may be a local system to the user (such as a personal computer or other computing device of the user). Regarding the system 300 being a local system, the interface 110 includes a display and input means (such as a keyboard and mouse) for a user to interact with a graphical user interface (GUI) of the system 300 in order to manage the programs or services. The GUI may be configured to allow the user to request one or more user actions be performed by the system 300 (or otherwise requested by the system 300 to be performed by a remote system to the system 300). Regarding the system 300 being a remote system, the interface 110 includes a wireless or wired means to communicate with a user device. In this manner, the user may interact with a GUI via a web browser of the user device or other portal to the remote system executing the program, and the user may indicate one or more user actions to be performed by the remote system via the GUI.

The database 320 may store the program to be executed by the system 300, other executable software, and/or other information or programs of the system 300. For information stored on the database 320, the database 320 may include a relational database capable of presenting the information as data sets in tabular form and capable of manipulating the data sets using relational operators. The database 320 may use Structured Query Language (SQL) for querying and maintaining the database 320.

The processor 330 may include one or more suitable processors capable of executing scripts or instructions of one or more software programs stored in system 300 (such as within the memory 335). The processor 330 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 335, which may be any suitable persistent memory (such as non-volatile memory or non-transitory memory) may store any number of software programs, executable instructions, machine code, algorithms, and the like that can be executed by the processor 330 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The management program 340 includes the program generated by the system 100 (described above). In this manner, the management program 340 includes one or more programs executed by the system 300 (such as the processor 330) to manage the products or services for one or more users (such as to allow a user to indicate one or more user actions to be performed). While the management program 340 is depicted as a separate component for clarity, the management program 340 may be executable machine code stored in the memory 335 or database 320 and executed by the processor 330. In some implementations, the system 300 and the system 100 are the same system. In some other implementations, system 300 and system 100 are different systems.

In managing products or services for a user, the system 300 (such as via executing the management program 340) may determine to perform or may perform one or more user actions based on dependencies between products or services. Whether and how to perform such user actions may also be based on the states of the products (such as described above with reference to a combination of products, states, and types for a variable agnostic object capturing product dependencies for the product to which a user action is to be performed (such as canceling a subscription to a product, converting the subscription from a trial subscription to a paid subscription, resubscribing, etc.)). For example, whether to perform a specific user action may be based on the dependency rules captured by the program that are associated with the product and state combinations. A general flow for managing products or services (such as performing one or more user actions), are described in general below with reference to FIG. 4.

Figure 4:
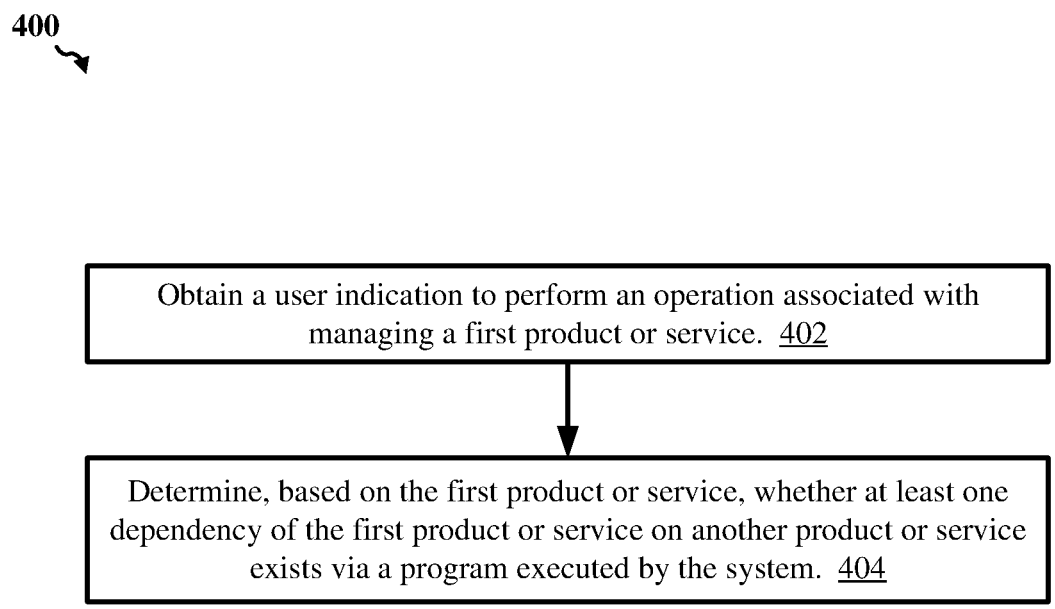
FIG. 4 shows an illustrative flow chart depicting an example operation for managing one or more products or services for a user, according to some implementations.

FIG. 4 shows an illustrative flow chart depicting an example operation 400 for managing one or more products or services for a user, according to some implementations. At 402, the system 300 obtains a user indication to perform an operation associated with managing a first product or service. For example, a user may indicate via a GUI a user action of opting-in from a trial subscription to a paid subscription, canceling a paid or trial subscription, or resubscribing to a subscription for a product or service. The user indication may be a click on a graphical button in the GUI indicating the desired operation.

At 404, the system 300 determines, based on the first product or service, whether at least one dependency of the first product or service on another product or service exists via a program executed by the system 300. For example, based on the user indication and the user profile or records, the first product, the first state of the first product (such as whether active-trial, inactive-paid, etc.), and the requested operation (such as opt-in, cancel, resubscribe, etc.) is known. The system 300 (executing the program generated by the system 100) uses the first product, state and, optionally, the requested operation to determine whether a dependency exists on another product. The system 300 may then use the state of the first product and the state of any dependent product to determine one or more corresponding dependency rules. The system 300 may then determine if the requested operation corresponds to the one or more dependency rules or is otherwise affected by the one or more dependency rules (such as whether the operation is allowed, prevented (blocked), or modified).

As noted above, the program executed by the system 300 captures the one or more dependencies based on one or more instances of a variable agnostic object, and the program is a product of the compiler 150 compiling the associated source code. For each of the one or more dependencies, the source code includes a depiction of the dependency via an instance of the one or more instances of the variable agnostic object (such as an instance of the example object 200 in FIG. 2). As noted above, the variable agnostic object may be associated with one or more libraries associated with the compiler 150 in order to compile the source code into the program to capture the dependencies and their effects on requested operations to the products.

If the system 300 determines that no dependency of the first product or service on another product or service exists (such as determining that no dependency rules corresponding to the first product and its state (and optionally the operation) indicate a dependent product to the first product), the system 300 performs the operation associated with managing the first product or service. For example, referring to dependency rule 8 in Table 1 above, if the user is associated with a paid subscription to QBO (the first product), an inactive trial subscription (which was canceled) to QBOP, and the user wishes to cancel an auto renew feature of the QBO subscription, the system 300 determines that dependency rule 8 does not prevent the operation (which is based on the associated variable agnostic object for the combination of products and services being associated with the parameters of the dependency rule during compilation). In this manner, the system 300 continues with performing the user action of canceling the auto renew feature of the QBO subscription.

The system 300 may determine that at least one dependency of the first product or service on another product or service exists (with the at least one dependency included in the one or more dependencies captured in the program), and the system 300 may determine whether the at least one dependency prevents the operation from being performed. For example and referring to Table 1, if the first product is QBO with an ACTIVE-PAID state and a dependent product is QBOP with an ACTIVE-TRIAL state (dependency rule 6)

and the requested user action is to cancel an auto renew feature for QBO, the system 300 determines from the dependency rule that the requested user action is not allowed. In general terms, the system 300 determines that the QBOP dependency prevents the cancel auto renew user action from being performed. Thus, in response to determining that at least one dependency prevents the operation from being performed, the system 300 may prevent performing the operation associated with managing the first product or service. In some implementations, in response to preventing performing the operation associated with managing the first product or service, the system 300 may provide an indication as to why the operation is prevented from being performed. For example, the program may be configured to cause the system 300 to provide a pop-up window or other alert via the GUI to the user to indicate why a requested user action cannot be performed.

Example operations include converting a trial subscription to a paid subscription to the first product or service (opting-in), deactivating an active subscription to the first product or service (canceling), and activating a subscription to the first product or service (resubscribing, opting-in, signing up, etc.). In a specific example of preventing a user action of opting-in or otherwise activating a subscription to a product or service, the system 300 may determine that: (1) the first product or service is dependent on a second product or service; (2) the operation includes activating a subscription to the first product or service; and (3) the user is not associated with an active subscription to the second product or service (such as QBOP dependent on QBO in an inactive state, but the user wishes to activate a subscription to QBOP). In response to the received request for the opt-in user action, the system 300 may prevent activating a subscription to the first product or service based on determining that the user is not associated with an active subscription to the second product or service. For example, a dependency rule captured in the libraries associated with the variable agnostic object for the specific dependency may indicate that the activate operation for QBOP is to be prevented by the system 300. Such operation flow regarding activation of a product or service is described in more detail below with reference to FIG. 5 regarding opt-in operation flows.

In a specific example of preventing an operation of canceling a product or service (for which the system 300 determines that the first product or service is dependent on a second product or service), the operation may include deactivating an active subscription to the first product or service and the user may be associated with an active subscription to the second product or service (such as QBO being dependent on QBOP in an active state for deactivating a QBO subscription; dependency rule 9 in Table 1). In response, the system 300 may prevent deactivating an active subscription to the first product or service based on determining that the user is associated with the active subscription to the second product or service. For example, the parameters for dependency rule 9 may indicate that the cancel operation for QBO is to be prevented by the system 300. Such operation flow regarding cancelation of a product or service is described in more detail below with reference to FIG. 6.

Conversely, in response to determining that the at least one dependency does not prevent the operation from being performed (such as the operation being explicitly allowed via a dependency rule or not being blocked by any matching dependency rules), the system 300 may perform the operation associated with managing the first product or service. For example, if the first product is QBO with an ACTIVE-PAID status and a dependent product is QBOP with an INACTIVE-TRIAL (canceled) status (dependency rule 8 of Table 1) and the requested user action is to cancel an auto renew feature for QBO, the system 300 determines that the QBOP dependency does not prevent the cancel auto renew user action from being performed. The system 300 may thus perform the user action of canceling the auto renew feature for QBO.

Figure 5:
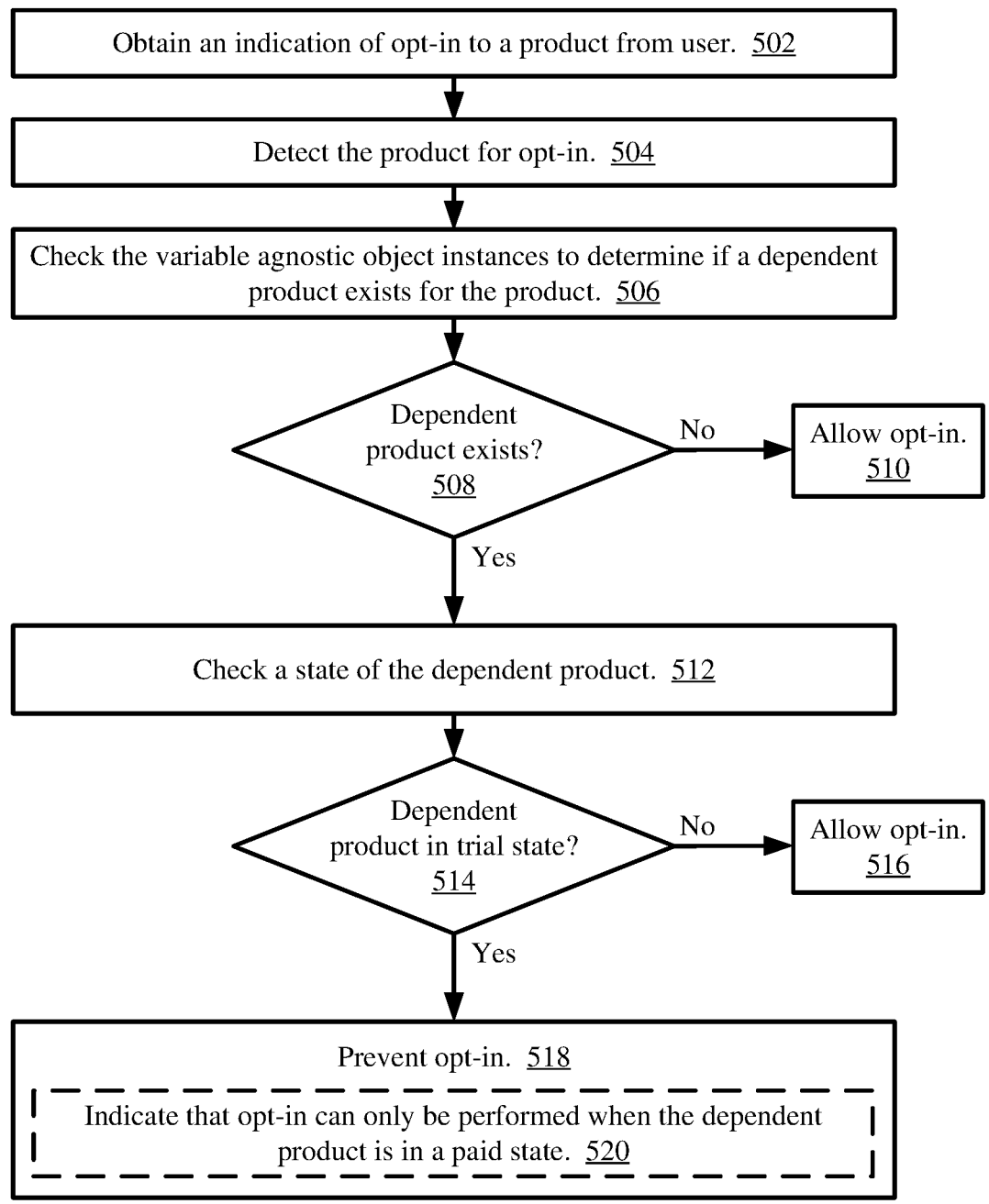
FIG. 5 shows an illustrative flow chart depicting an example operation flow for an opt-in user action for a product, according to some implementations.
Figure 6:
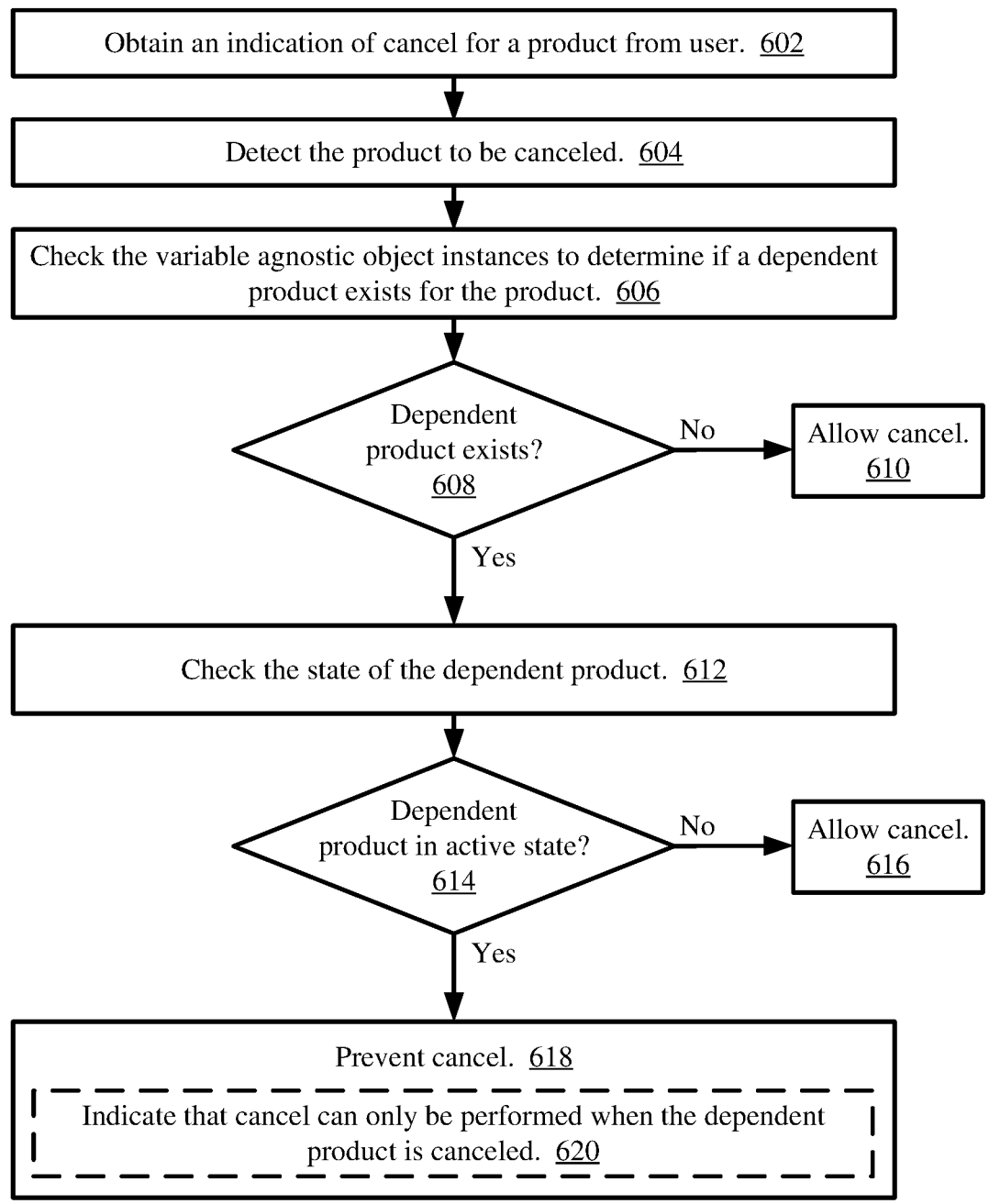
FIG. 6 shows an illustrative flow chart depicting an example operation flow for a cancel user action for a product, according to some implementations.
Figure 7:
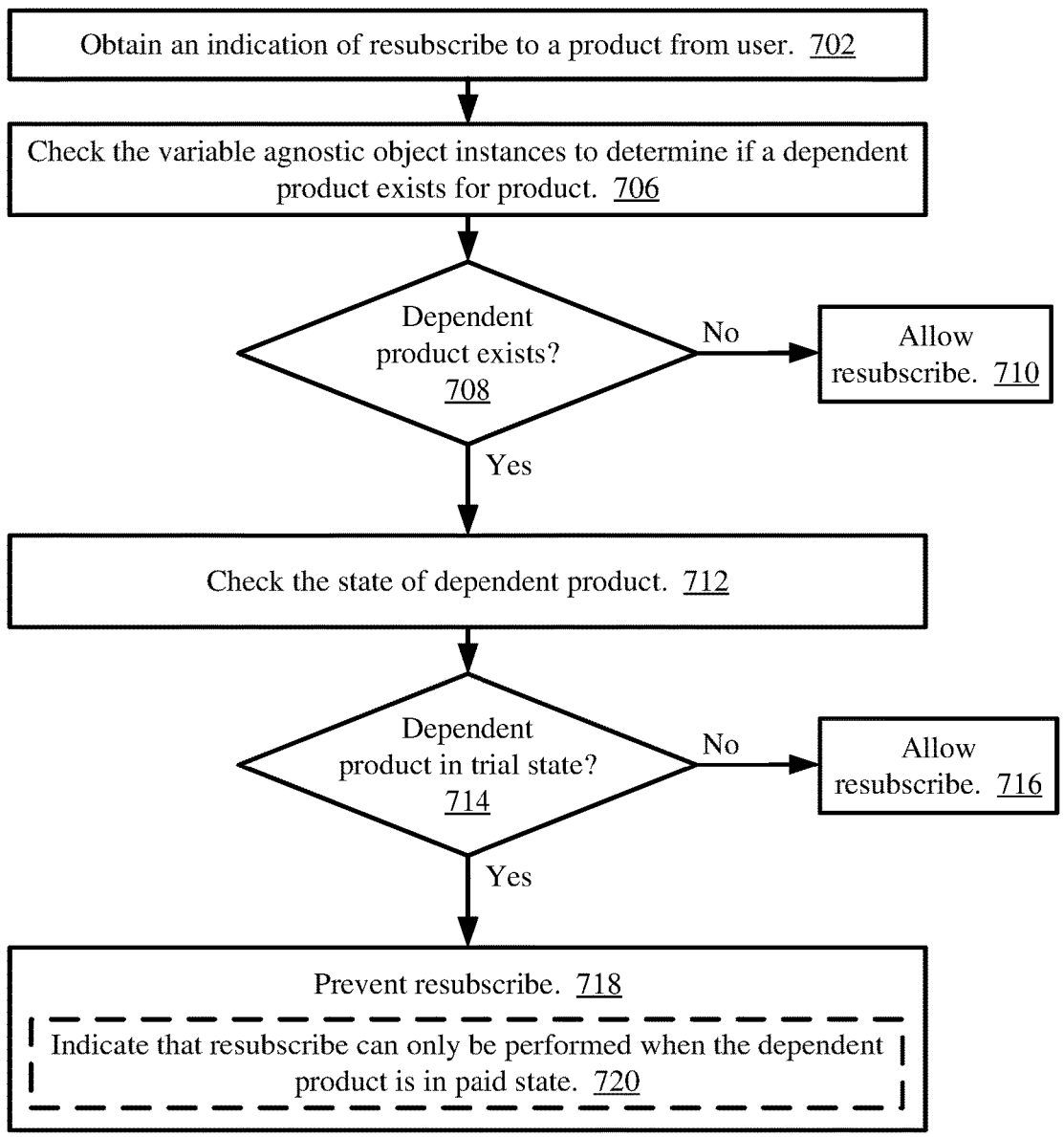
FIG. 7 shows an illustrative flow chart depicting an example operation flow for a resubscribe user action for a product, according to some implementations.

For the various user actions (such as opt-in, cancel, or resubscribe) associated with various dependency rules, example operation flows are captured by the program to handle processing of the operation request. Example operation flows for the three example user actions opt-in, cancel, and resubscribe are depicted in FIGS. 5-7 and are described below. The operation flows may be depicted in the source code and thus captured by the program, and the execution of the operation flows may include interaction with the variable agnostic objects and associated dependency rule parameters to perform such flows.

FIG. 5 shows an illustrative flow chart depicting an example operation flow 500 for an opt-in user action for a product, according to some implementations. At 502, the system 300 obtains an indication of an opt-in operation to a product from a user. At 504, the system 300 detects the product for opt-in (such as which product the user wishes to convert a trial subscription to a paid subscription). At 506, the system 300 checks the variable agnostic object instances to determine if a dependent product exists for the product. For example, instances of the variable agnostic object 200 may be used in the source code to depict each combination of products and states and to indicate the dependencies associated with the combination of products and states. In this manner, the dependencies are captured in the program, and the system 300 determines from the dependencies if a dependent product exists for the product. At decision block 508, if a dependent product does not exist (such as no variable agnostic objects for the product and another product indicating that the other product is a dependent product), the system 300 may allow opt-in to the product (510). In this manner, the system 300 may perform the operation of converting a trial subscription to a paid subscription for the product. If a dependent product does exist (such as a variable agnostic object for the product and another product indicating that the other product is a dependent product), the system 300 may check a state of the dependent product (512). For example, the system 300 may determine a subscription status of the dependent product from a user profile or other records.

At decision block 514, if the dependent product is not in a trial state (such as a base product being associated with a paid subscription and not a trial subscription), the system 300 may allow opt-in to the product (516). In this manner, the system 300 may perform the operation of converting a trial subscription to a paid subscription for the product. If the dependent product is in a trial state (such as a base product being associated with a trial subscription instead of a paid subscription), the system 300 may prevent opt-in to the product (518). The system 300 may prevent opt-in because a paid subscription to the dependent product is required before converting a trial subscription to a paid subscription to the target product. In some implementations of preventing opt-in, the system 300 may indicate that opt-in can only be performed when the dependent product is in a paid state (520). For example, the system 300 may provide an indication to a GUI to indicate that a trial subscription cannot be converted to a paid subscription for a target product unless a paid subscription exists for the base/dependent product.

While FIG. 5 depicts only checking for a trial state of the dependent product, the system 300 may also check for an inactive state of the dependent product (such as a canceled subscription to the base product) or other states that would prevent opt-in for the target product.

FIG. 6 shows an illustrative flow chart depicting an example operation flow 600 for a cancel user action for a product, according to some implementations. At 602, the system 300 obtains an indication of a cancel operation for a product from a user. At 604, the system 300 detects the product to be canceled (such as which product the user wishes to end a paid subscription to convert from an active state to an inactive state). At 606, the system 300 checks the variable agnostic object instances to determine if a dependent product exists for the product. For example, instances of the variable agnostic object 200 may be used in the source code to depict each combination of products and states and to indicate the dependencies associated with the combination of products and states. In this manner, the dependencies are captured in the program, and the system 300 determines from the dependencies if a dependent product exists for the product. At decision block 608, if a dependent product does not exist (such as no variable agnostic objects for the product and another product indicating that the other product is a dependent product), the system 300 may allow cancellation of the product (610). In this manner, the system 300 may perform the operation of canceling a subscription to the product. If a dependent product does exist (such as a variable agnostic object for the product and another product indicating that the other product is a dependent product), the system 300 may check a state of the dependent product (612). For example, the system 300 may determine a subscription status of the dependent product from a user profile or other records.

At decision block 614, if the dependent product is not in an active state (such as a base product not being associated with a paid subscription or trial subscription), the system 300 may allow cancellation of the product (616). In this manner, the system 300 may perform the operation of canceling a subscription to the product. If the dependent product is in an active state (such as the user having a paid subscription to the base product), the system 300 may prevent cancellation of the product (618). The system 300 may prevent cancellation because a paid subscription to the dependent product (such as an add-on product to a base product) is required to be canceled before canceling a subscription to the target product. In some implementations of preventing cancellation, the system 300 may indicate that the cancellation operation can only be performed when the dependent product is canceled (620). For example, the system 300 may provide an indication to a GUI to indicate that a subscription cannot be canceled for a base product unless a paid subscription to an add-on product is first canceled.

FIG. 7 shows an illustrative flow chart depicting an example operation flow 700 for a resubscribe user action for a product, according to some implementations. At 702, the system 300 obtains an indication of a resubscribe operation to a product from a user. At 706, the system 300 checks the variable agnostic object instances to determine if a dependent product exists for the product. For example, instances of the variable agnostic object 200 may be used in the source code to depict each combination of products and states and to indicate the dependencies associated with the combination of products and states. In this manner, the dependencies are captured in the program, and the system 300 determines from the dependencies if a dependent product exists for the product. At decision block 708, if a dependent product does not exist (such as no variable agnostic objects for the product and another product indicating that the other product is a dependent product), the system 300 may allow resubscription to the product (710). In this manner, the system 300 may perform the operation of extending the subscription to the product a defined term, enrolling the user in an auto-renewal program, or activating a previously deactivated subscription. If a dependent product does exist (such as a variable agnostic object for the product and another product indicating that the other product is a dependent product), the system 300 may check a state of the dependent product (712). For example, the system 300 may determine a subscription status of the dependent product from a user profile or other records.

At decision block 714, if the dependent product is not in a trial state (such as a base product not being associated with a trial subscription instead of a paid subscription), the system 300 may allow resubscription to the product (716). In this manner, the system 300 may perform the operation of extending the subscription to the product a defined term, enrolling the user in an auto-renewal program, or activating a previously deactivated subscription. If the dependent product is in a trial state (such as the user having a trial subscription to the base product instead of a paid subscription), the system 300 may prevent resubscription to the product (718). The system 300 may prevent resubscription because the user does not have a paid subscription to the dependent product (such as base product to the target product, which may be an add-on product). In this manner, a paid subscription to the dependent product is required before resubscribing to the target product. In some implementations of preventing resubscription, the system 300 may indicate that the resubscription operation can only be performed when the dependent product is in a paid state (the user has a paid subscription to the dependent product) (720). For example, the system 300 may provide an indication to a GUI to indicate that a target product cannot be resubscribed to unless the user first obtains a paid subscription to a base (dependent) product.

The above operation flows are examples that may be implemented in the program, and operation flows may be implemented for other operations in the program. The operation flows define checking for dependencies based on the variable agnostic objects, and the dependencies may be associated with one or more dependency rules to prevent, allow, or modify specific user actions. As noted above, variable agnostic objects are included in a programming interface by a programmer to define all of the dependencies between products (or other variables) for a program, and each variable agnostic object may be associated with a specific dependency rule defined in the libraries. In this manner, a dependency may be updated by adjusting a single variable agnostic object to account for the change in dependency (with the source code being recompiled after the updating). As a result, the entire source code does not need to be reviewed and revised to account for a change in dependency that may have been hardcoded in multiple locations in the source code.

Regarding programming the source code including one or more instances of the variable agnostic object to depict dependencies between variables, FIG. 8 shows an illustrative flow chart depicting an example operation 800 for capturing one or more dependencies between variables using a variable agnostic object of a programming interface, according to some implementations. The example operation 800 in FIG. 8 is described below as being performed by the system 100. At 802, the system 100 obtains an indication of a first dependency of a first variable to a second variable via a programming interface. At 804, the system 100 depicts the first dependency, the first variable, and the second variable in a first instance of a variable agnostic object in a source code. For example, a programmer may intend to depict a dependency between a first product and a second product. The programmer may input a copy of the generic variable agnostic object 200 (such as a copy and paste of the template object) into the programming interface 140 (such as a text document or program configured to receive source code from a programmer). The programmer may then adjust the products 202, subscription states 204, and dependent products 206 to indicate any dependencies associated with the products 202 for the subscription states 204. In some implementations, the instance of the variable agnostic object may depict a dependency of the second variable to the first variable as well as a dependency of the first variable to the second variable.

At 806, the system 100 obtains an indication of a second dependency of a third variable to a fourth variable via the programming interface. At 808, the system 100 depicts the second dependency, the third variable, and the fourth variable in a second instance of the variable agnostic object in the source code. As noted above, each instance of the variable agnostic object may be associated with a unique combination of variables and variable states. For example, different instances of the variable agnostic object 200 may be input by the programmer for different combinations of subscription states 204 of the products 202 (such as active, inactive, paid, trial, etc. and as described above with reference to Table 1). Different instances of the variable agnostic object 200 may also be input by the programmer for different combinations of products (such as for a first combination of QBO and QBOP and for a second combination of QBO and QBOC). Any number of instances of the variable agnostic object may be used to indicate any number of dependencies between any number of combinations of variables and states. As noted above, examples of the variables (such as the first variable, the second variable, the third variable, and the fourth variable) are services or products offered to one or more users.

At 810, the system 100 compiles (such as by the compiler 150) the source code (including the instances of the variable agnostic object) to generate a computer-executable program capturing the first dependency and the second dependency. The variable agnostic object may be associated with one or more libraries including dependency rules, and operation flows captured in the compiled program may include calls to the instances of the variable agnostic object and associated dependency rules to determine what operations may or may not be performed by the system 300 executing the compiled program. If the variables are products or services, the first dependency may be associated with a first user action and the second dependency may be associated with a second user action. For example, a dependency rule associated with the first instance of the variable agnostic object may indicate that the first user action is allowed, prevented, or is to be modified, and a dependency rule associated with the second instance of the variable agnostic object may indicate that the second user action is allowed, prevented, or is to be modified. Example user actions may include one of deactivating an active subscription to a service or product, activating a subscription to the service or product, or converting a trial subscription to a paid subscription to the service or product.

As noted above, changes to the dependencies may be desired after compiling the program executed by system 300. For example, additional products or services may be offered, multiple products or services may be combined, or a product or service may be split into multiple offerings. As a result, the program is to be updated to account for the changes in dependencies. For example, after compiling the source code (to generate the program), the system 100 may obtain an indication that the first dependency is no longer valid. The system 100 may remove the first instance of the variable agnostic object from the source code and recompile the source code to generate an updated computer-executable program with the first dependency removed. For example, a programmer, via the programming interface, may remove the instance of the variable agnostic object 200 originally used to depict the first dependency. In this manner, without rewriting large swaths of the source code, the updated source code no longer depicts the first dependency, and the recompiled program does not capture the first dependency.

In another example, after compiling the source code, the system 100 may obtain an indication of a third dependency of a fifth variable to a sixth variable via the programming interface, and the system 100 may depict the third dependency, the fifth variable, and the sixth variable in a third instance of the variable agnostic object in the source code. For example, if a third dependency is to be added, a programmer may add an instance of the generic variable agnostic object 200 to the source code and update the instance to indicate the third dependency. The system 100 may then recompile the source code to generate an updated computer-executable program capturing the third dependency. In this manner, the updated program captures the third dependency without requiring a rewrite of large swaths of the source code to hardcode the dependency and associated operations. While the examples describe removing or adding one instance of the variable agnostic object for clarity, multiple instances may be added or removed as suitable.

In this manner, a variable agnostic object may be used to depict dependencies between variables in a program without requiring hardcoding of the specific dependencies. Through the use of a variable agnostic object instead of hardcoding dependencies, dependencies between variables during programming can be easily scaled and managed over time as the program is to evolve to meet a provider's or user's needs.

The particular architecture of the system 100 shown in FIG. 1 and of the system 300 shown in FIG. 3 are but two examples of a variety of different architectures within which aspects of the present disclosure may be implemented. For example, in other implementations, components of the system 100 or the system 300 may be distributed across multiple devices, may be included in fewer components, and so on. While the above examples of capturing dependencies between user products or services are described with reference to system 100, any suitable system may be used to perform the operations described herein. Further, while the above examples of managing products or services based on one or more dependencies are described with reference to system 300, any suitable system may be used to perform the operations described herein. As noted above, system 100 and system 300 may be the same system or different systems. In addition, while aspects of the present disclosure are described in the examples herein with reference to capturing dependencies between user products or services for clarity purposes, aspects of the present disclosure may apply to dependencies between any variables needing to be captured in software.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A computer-implemented method for capturing, by a computing system, one or more dependencies between variables using a variable agnostic object in source code, comprising:
    obtaining an indication of a first dependency of a first variable to a second variable via a programming interface of the computing system;
    depicting the first dependency, the first variable, and the second variable in a first instance of a variable agnostic object in a source code in response to obtaining the indication, wherein the first dependency is defined in dependency rules stored in one or more libraries instructing one or more computer operations be performed for the first dependency;
    obtaining an indication of a second dependency of a third variable to a fourth variable via the programming interface;
    depicting the second dependency, the third variable, and the fourth variable in a second instance of the variable agnostic object in the source code in response to obtaining the indication, wherein the second dependency is defined in the dependency rules stored in the one or more libraries instructing one or more computer operations be performed for the second dependency; and
    compiling, by a compiler, the source code to generate a computer-executable program capturing the first dependency and the second dependency based on the first instance and the second instance of the variable agnostic object in the source code, wherein compiling the source code includes generating calls to the one or more libraries, wherein the calls are to be executed for the first instance and the second instance of the variable agnostic object.

2. The method of claim 1, wherein the first variable, the second variable, the third variable, and the fourth variable are services or products offered to one or more users.

3. The method of claim 2, wherein:
    the first dependency is associated with a first user action; and
    the second dependency is associated with a second user action.

4. The method of claim 3, wherein each of the first user action and the second user action is one of:
- deactivating an active subscription to a service or product;
- activating a subscription to the service or product; or
- converting a trial subscription to a paid subscription to the service or product.

5. The method of claim 1, further comprising:
- after compiling the source code, obtaining an indication that the first dependency is no longer valid;
- removing the first instance of the variable agnostic object from the source code in response to obtaining the indication; and
- recompiling, by the compiler, the source code to generate an updated computer-executable program with the first dependency removed, wherein recompiling the source code includes removing the calls to the one or more libraries for the first instance of the variable agnostic object.

6. The method of claim 1, further comprising:
- after compiling the source code, obtaining an indication of a third dependency of a fifth variable to a sixth variable via the programming interface;
- depicting the third dependency, the fifth variable, and the sixth variable in a third instance of the variable agnostic object in the source code in response to obtaining the indication, wherein the third dependency is defined in the dependency rules stored in the one or more libraries instructing one or more computer operations be performed for the third dependency; and
- recompiling, by the compiler, the source code to generate an updated computer-executable program capturing the third dependency based on the third instance of the variable agnostic object in the source code, wherein recompiling the source code includes generating additional calls to the one or more libraries, wherein the additional calls are to be executed for the third instance of the variable agnostic object.

7. A system for capturing one or more dependencies between variables using a variable agnostic object in source code, the system comprising:
- one or more processors; and
- a memory storing instructions that, when executed by the one or more processors, causes the system to perform operations comprising:
  - obtaining an indication of a first dependency of a first variable to a second variable via a programming interface of the system;
  - depicting the first dependency, the first variable, and the second variable in a first instance of a variable agnostic object in a source code in response to obtaining the indication, wherein the first dependency is defined in dependency rules stored in one or more libraries instructing one or more computer operations be performed for the first dependency;
  - obtaining an indication of a second dependency of a third variable to a fourth variable via the programming interface of the system;
  - depicting the second dependency, the third variable, and the fourth variable in a second instance of the variable agnostic object in the source code in response to obtaining the indication, wherein the second dependency is defined in the dependency rules stored in the one or more libraries instructing one or more computer operations be performed for the second dependency; and
  - compiling, by a compiler, the source code to generate a computer-executable program capturing the first dependency and the second dependency based on the first instance and the second instance of the variable agnostic object in the source code, wherein compiling the source code includes generating calls to the one or more libraries, wherein the calls are to be executed for the first instance and the second instance of the variable agnostic object.

8. The system of claim 7, wherein the first variable, the second variable, the third variable, and the fourth variable are services or products offered to one or more users.

9. The system of claim 8, wherein:
- the first dependency is associated with a first user action; and
- the second dependency is associated with a second user action.

10. The system of claim 9, wherein each of the first user action and the second user action is one of:
- deactivating an active subscription to a service or product;
- activating a subscription to the service or product; or
- converting a trial subscription to a paid subscription to the service or product.

11. The system of claim 7, wherein the operations further comprise:
- after compiling the source code, obtaining an indication that the first dependency is no longer valid;
- removing the first instance of the variable agnostic object from the source code in response to obtaining the indication; and
- recompiling, by the compiler, the source code to generate an updated computer-executable program with the first dependency removed, wherein recompiling the source code includes removing the calls to the one or more libraries for the first instance of the variable agnostic object.

12. The system of claim 7, wherein the operations further comprise:
- after compiling the source code, obtaining an indication of a third dependency of a fifth variable to a sixth variable via the programming interface;
- depicting the third dependency, the fifth variable, and the sixth variable in a third instance of the variable agnostic object in the source code in response to obtaining the indication, wherein the third dependency is defined in the dependency rules stored in the one or more libraries instructing one or more computer operations be performed for the third dependency; and
- recompiling, by the compiler, the source code to generate an updated computer-executable program capturing the third dependency based on the third instance of the variable agnostic object in the source code, wherein recompiling the source code includes generating additional calls to the one or more libraries, wherein the additional calls are to be executed for the third instance of the variable agnostic object.

13. A system for managing one or more products or services for a user, the system comprising:
- one or more processors; and
- a memory storing instructions that, when executed by the one or more processors, causes the system to perform operations comprising:
  - obtaining a user indication to perform an operation associated with managing a first product or service;
  - executing a program stored in the memory and executed by the one or more processors of the system, wherein:
    - the program captures one or more dependencies of products or services to other products or services based on one or more instances of a variable agnostic object in a source code;

the program is a product of a compiler compiling the source code;

for each of the one or more dependencies, the source code includes a depiction of the dependency via an instance of the one or more instances of the variable agnostic object; and the program includes calls to one or more libraries stored in the memory, wherein the one or more libraries store dependency rules defining at least one dependency of a first product or service to another product or service, and the one or more libraries instruct one or more system operations be performed for the at least one dependency in response to executing the calls to the one or more libraries; and determining that the at least one dependency of the first product or service to another product or service exists via execution of the program.

14. The system of claim 13, wherein the operations further comprise:

determining whether the at least one dependency prevents the operation from being performed;

in response to determining that the at least one dependency does not prevent the operation from being performed, performing the operation associated with managing the first product or service; and in response to determining that the at least one dependency prevents the operation from being performed, preventing performing the operation associated with managing the first product or service.

15. The system of claim 14, wherein the operations further comprise:

in response to preventing performing the operation associated with managing the first product or service, providing an indication as to why the operation is prevented from being performed.

16. The system of claim 14, wherein the operation prevented from being performed includes one of:

deactivating an active subscription to the first product or service;

activating a subscription to the first product or service; or converting a trial subscription to a paid subscription to the first product or service.

17. The system of claim 16, wherein the operations further comprise:

determining that the first product or service is dependent on a second product or service;

determining that the operation includes deactivating an active subscription to the first product or service;

determining that the user is associated with an active subscription to the second product or service; and preventing deactivating an active subscription to the first product or service based on determining that the user is associated with the active subscription to the second product or service.

18. The system of claim 16, wherein the operations further comprise:

determining that the first product or service is dependent on a second product or service;

determining that the operation includes activating a subscription to the first product or service;

determining that the user is not associated with an active subscription to the second product or service; and preventing activating the subscription to the first product or service based on determining that the user is not associated with the active subscription to the second product or service.

* * * * *